United States Patent
Hoshi et al.

(10) Patent No.: US 7,299,788 B2
(45) Date of Patent: Nov. 27, 2007

(54) INTERNAL COMBUSTION ENGINE AND METHOD OF DETECTING ABNORMALITY OF INTERNAL COMBUSTION ENGINE

(75) Inventors: Koichi Hoshi, Susono (JP); Kenji Sakurai, Gotemba (JP); Makoto Tomimatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/510,610

(22) Filed: Aug. 28, 2006

(65) Prior Publication Data

US 2007/0044761 A1 Mar. 1, 2007

(30) Foreign Application Priority Data

Aug. 29, 2005 (JP) ............................. 2005-247660

(51) Int. Cl.
*F02D 13/02* (2006.01)
*F02D 41/26* (2006.01)
*F02D 43/04* (2006.01)
*G01M 15/08* (2006.01)

(52) U.S. Cl. .................. 123/435; 73/118.2; 123/90.15; 123/479; 123/494

(58) Field of Classification Search ............ 123/90.11, 123/90.15–90.17, 198 D, 198 DB, 435, 479, 123/493, 494; 73/118.2
See application file for complete search history.

(56) References Cited

U.S. PATENT DOCUMENTS

| | | | | | |
|---|---|---|---|---|---|
| 4,825,833 | A | * | 5/1989 | Ikeura et al. | 123/435 |
| 4,971,009 | A | * | 11/1990 | Washino et al. | 123/435 |
| 5,156,126 | A | * | 10/1992 | Ohkubo et al. | 123/435 |
| 5,878,717 | A | * | 3/1999 | Zur Loye | 123/435 |
| 6,728,627 | B2 | * | 4/2004 | Machida | 73/118.2 |
| 6,848,301 | B2 | * | 2/2005 | Kondo | 73/118.2 |
| 6,981,488 | B2 | * | 1/2006 | Harris et al. | 123/435 |
| 2004/0084025 | A1 | * | 5/2004 | Zhu et al. | 123/435 |

FOREIGN PATENT DOCUMENTS

JP 2004-138036 5/2004

* cited by examiner

*Primary Examiner*—T. M Argenbright
(74) *Attorney, Agent, or Firm*—Kenyon & Kenyon LLP

(57) ABSTRACT

When fuel supply is stopped while an engine is decelerating, pressure in each cylinder is detected using a pressure sensor, and the peak value of the pressure in each cylinder is determined. Also, an intake air amount is detected when the fuel supply is stopped, and the allowable range of the peak value is calculated based on the intake air amount. When the peak value of the pressure in a cylinder is in the allowable range, it is determined that a charged air amount in the cylinder is in a target amount range. When the peak value of the pressure in a cylinder is out of the allowable range, it is determined that the charged air amount in the cylinder is out of the target amount range, and a warning device is operated.

18 Claims, 9 Drawing Sheets

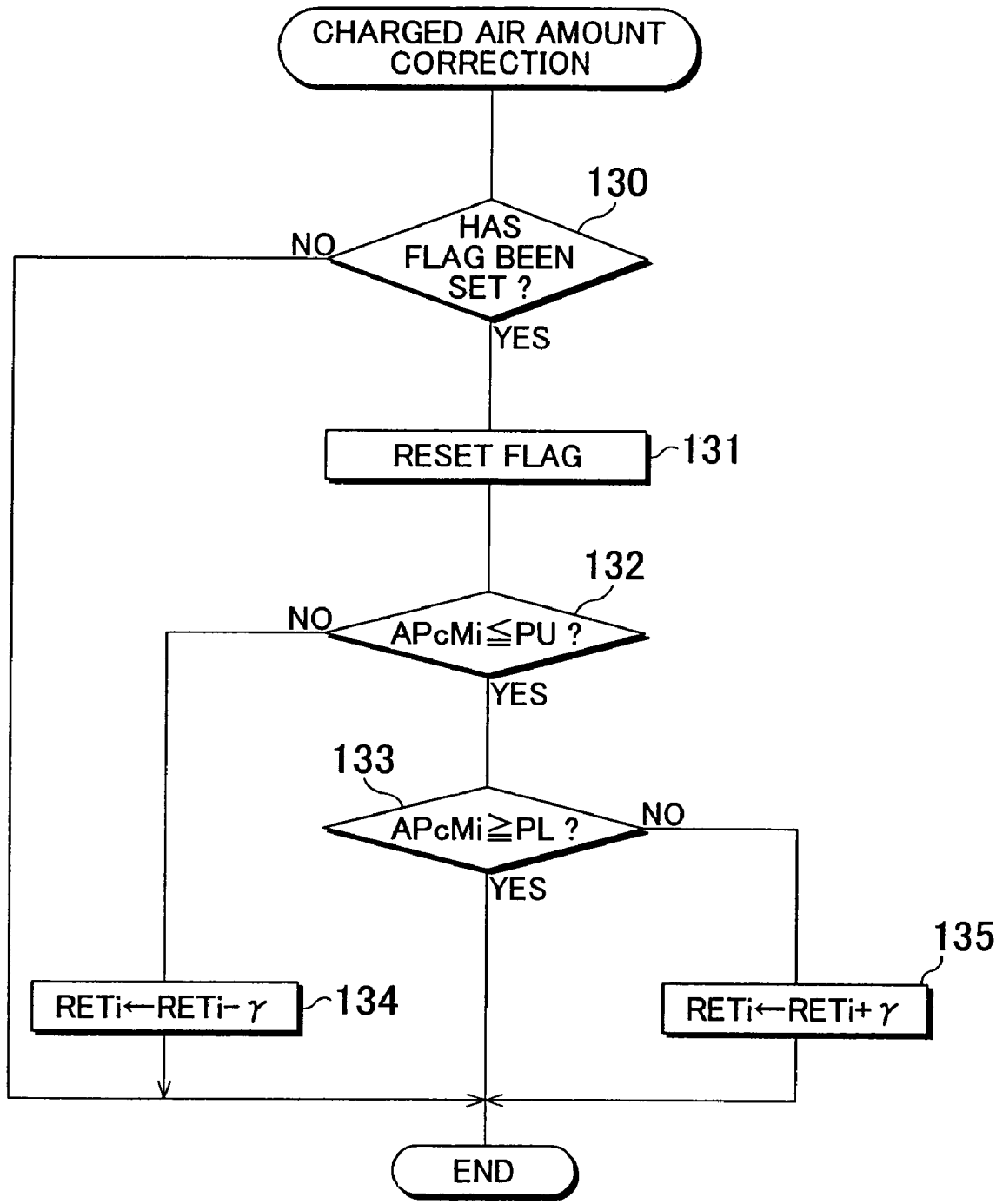

INTERNAL COMBUSTION ENGINE AND METHOD OF DETECTING ABNORMALITY OF INTERNAL COMBUSTION ENGINE

INCORPORATION BY REFERENCE

The disclosure of Japanese Patent Application No. 2005-247660 filed on Aug. 29, 2005, including the specification, drawings and abstract is incorporated herein by reference in its entirety.

BACKGROUND OF THE INVENTION

1. Field of the Invention

The invention relates to an internal combustion engine and a method of detecting an abnormality of an internal combustion engine.

2. Description of the Related Art

When the amount, of air charged in a cylinder (hereinafter, referred to as "charged air amount") varies among cylinders, combustion pressure also varies among cylinders. Accordingly, Japanese Patent Application Publication No. JP-A-2004-138036 describes an internal combustion engine in which the combustion pressure in each cylinder is detected, and a variation in the charged air amount among cylinders is detected based on the detected combustion pressure in each cylinder.

However, the combustion pressure varies among the cylinders, not only due to the variation in the charged air amount among the cylinders, but also due to a variation in the fuel injection amount or the injection timing of a fuel injection valve, the ignition timing of a spark plug, or the like among the cylinders. Therefore, the variation in the charged air amount among the cylinders cannot be accurately detected by detecting the variation in the combustion pressure among the cylinders. Thus, even if the charged air amount is controlled when the variation in the combustion pressure among the cylinders is detected, the variation in the charged air amount among the cylinders cannot be necessarily reduced.

Further, the charged air amount cannot be accurately detected by detecting the combustion pressure. Thus, even if the combustion pressure is controlled so that actual combustion pressure matches a value detected when the charged air amount matches a target amount, the actual charged air amount does not necessarily match the target amount.

SUMMARY OF THE INVENTION

The invention provides an internal combustion engine that makes it possible to accurately detect a charged air amount in each of cylinders or a variation between the largest charged air amount and the smallest charged air amount among the charged air amounts in the cylinders, and to reliably make the charged air amount in each of the cylinders fall in a target amount range, or to reliably decrease the variation between the largest charged air amount and the smallest charged air amount. The invention also provides a method of detecting an abnormality in an internal combustion engine based on a variation between the largest charged air amount and the smallest charged air amount among the charged air amounts in cylinders.

A first aspect of the invention relates to an internal combustion engine that includes stop means, pressure detection means, and variation detection means. The stop means temporarily stops fuel supply to the internal combustion engine when the internal combustion engine is operating. The pressure detection means detects pressure in each of cylinders when the fuel supply is stopped. The variation detection means detects a variation between the largest charged air amount and the smallest charged air amount among the charged air amounts in the cylinders, which are amounts of air charged in the cylinders, based on the pressure in each of the cylinders, which is detected by the pressure detection means.

A second aspect of the invention relates to an internal combustion engine that includes stop means, pressure detection means, and determination means. The stop means temporarily stops fuel supply to the internal combustion engine when the internal combustion engine is operating. The pressure detection means detects pressure in each of cylinders when the fuel supply is stopped. The determination means determines whether a charged air amount in each of the cylinders, which is the amount of air charged in each of the cylinders, is in a target amount range, based on the pressure in each of the cylinders, which is detected by the pressure detection means.

A third aspect of the invention relates to a method of detecting an abnormality in an internal combustion engine. The method includes temporarily stopping fuel supply to the internal combustion engine when the internal combustion engine is operating; detecting pressure in each of cylinders when the fuel supply is stopped; and detecting a variation between the largest charged air amount and the smallest charged air amount among charged air amounts in the cylinders, which are amounts of air charged in the cylinders, based on, the detected pressure in each of the cylinders.

A fourth aspect of the invention relates to a method of detecting an abnormality in an internal combustion engine. The method includes temporarily stopping fuel supply to the internal combustion engine when the internal combustion engine is operating; detecting pressure in each of cylinders when the fuel supply is stopped; and determining whether a charged air amount in each of the cylinders, which is the amount of air charged in each of the cylinders, is in a target amount range, based on the detected pressure in each of the cylinders.

Thus, according to the invention, it is possible to accurately detect the charged air amount in each of the cylinders or the variation between the largest charged air amount and the smallest charged air amount among the charged air amounts in the cylinders, and to reliably make the charged air amount in each of the cylinders fall in the target amount range, or to reliably decrease the variation between the largest charged air amount and the smallest charged air amount.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 12 is a flowchart showing a charged air amount correction routine according to another embodiment of the invention.

DETAILED DESCRIPTION OF THE PREFERRED EMBODIMENTS

Figure 1:
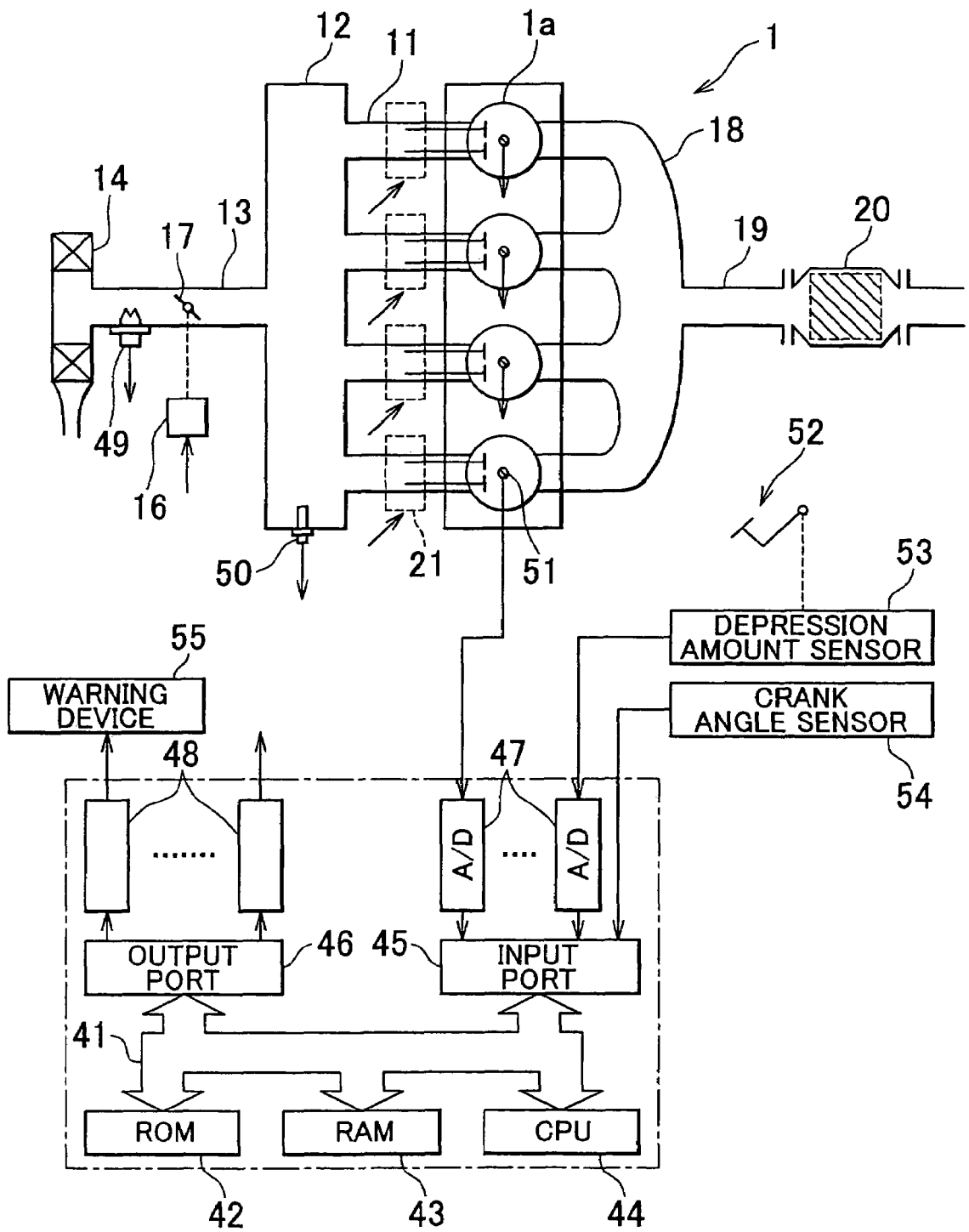
FIG. 1 is a diagram showing an entire internal combustion engine.

FIG. 1 shows a case where the invention is applied to a spark ignition internal combustion engine. However, the invention may be applied to a compression ignition internal combustion engine.

Figure 2:
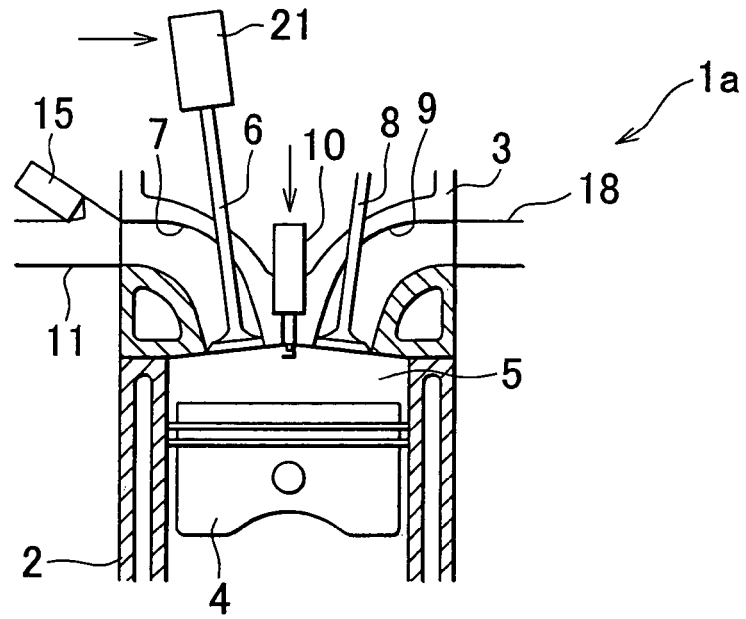
FIG. 2 is a longitudinal sectional view showing a cylinder.

Referring to FIG. 1, an engine body 1 includes, for example, four cylinders 1a. Referring to FIG. 2 that is a longitudinal sectional view of each cylinder 1a along with FIG. 1, the engine body 1 includes a cylinder block 2, a cylinder head 3, pistons 4, combustion chambers 5, intake valves 6, intake ports 7, exhaust valves 8, exhaust ports 9, and spark plugs 10. The intake ports 7 are connected to a surge tank 12 via corresponding intake branch pipes 11. The surge tank 12 is connected to an air cleaner 14 via an intake duct 13. A fuel injection valve 15 is disposed in each of the intake branch pipes 11. A throttle valve 17 driven by a step motor 16 is disposed in the intake duct 13. Each intake valve 6 is driven by an intake valve drive device 21 provided for each cylinder. The exhaust ports 9 are connected to a catalytic converter 20 via an exhaust manifold 18 and an exhaust pipe 19.

Referring to FIG. 1, an electronic control unit 40 includes a digital computer. The digital computer includes ROM (Read Only Memory) 42, RAM (Random Access Memory) 43, a CPU (micro processor) 44, an input port 45, and an output port 46, which are connected to each other by a bi-directional bus 41. An airflow meter 49 is provided in the intake duct 13 at a position upstream of the throttle valve 17. The airflow meter 49 detects an intake air amount Ga. A pressure sensor 50 is provided in the combustion chamber 5 of each cylinder. The pressure sensor 50 sequentially detects cylinder pressure Pc, for example, at intervals of 10 ms. A depression amount sensor 53 is connected to an accelerator pedal 52. The depression amount sensor 53 detects the depression amount of the accelerator pedal 52. The signals output from these sensors 49, 50, 51, and 53 are input to the input port 45 via corresponding AD converters 47. Further, the input port 45 is connected to a crank angle sensor 54 that generates an output pulse every time a crankshaft rotates, for example, by 30 degrees. The CPU 44 calculates an engine speed NE based on the output pulse of the crank angle sensor 54.

The output port 46 is connected to the spark plugs 10, the fuel injection valves 15, the step motor 16, the intake valve drive devices 21, and a warning device 55 via corresponding drive circuits 48. The spark plugs 10, the fuel injection valves 15, the step motor 16, the intake valve drive devices 21, and the warning device 5 are controlled based on the signals output from the electronic control unit 40. The warning device 55 is provided to notify a vehicle driver that an abnormality has occurred, as described later. The warning device 55 includes, for example, a lamp or a buzzer.

Figure 3:
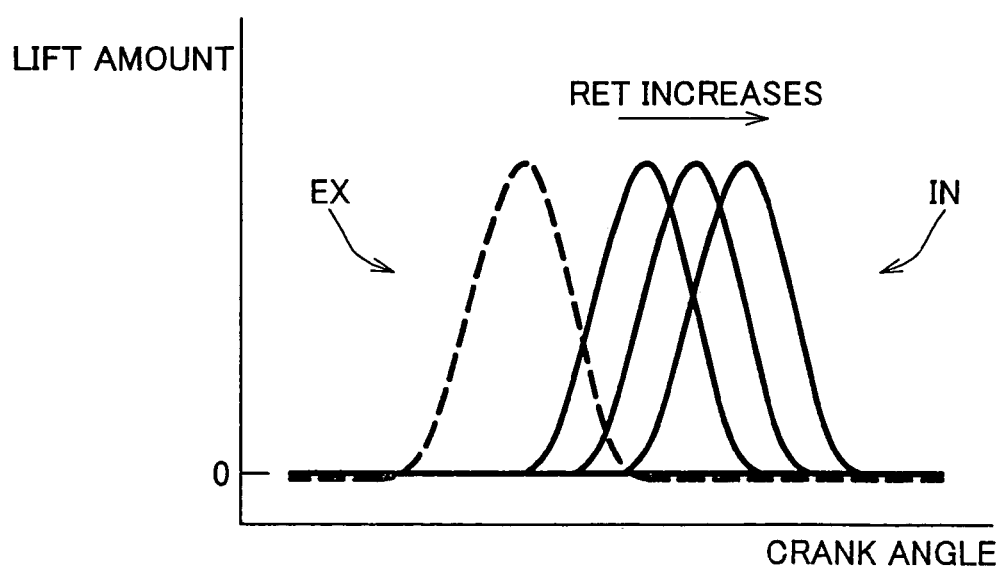
FIG. 3 is a diagram explaining the opening/closing operation of an intake valve according to an embodiment of the invention.

Each of the above-described intake valve drive devices 21 can change the opening/closing operation of the corresponding intake valve 6. In the embodiment of the invention, the opening timing (phase) of the intake valve 6 is continuously changed while the maximum lift amount and the opening period (duration) of the intake valve 6 are maintained at substantially constant values. In this case, the opening/closing operation of the intake valve 6 can be represented by a retard amount RET by which the opening period of the intake valve 6 is retarded with respected to the most advanced opening period of the intake valve 6. In FIG. 3, a dashed line indicates the opening/closing operation of the exhaust valve 8.

Figure 4:
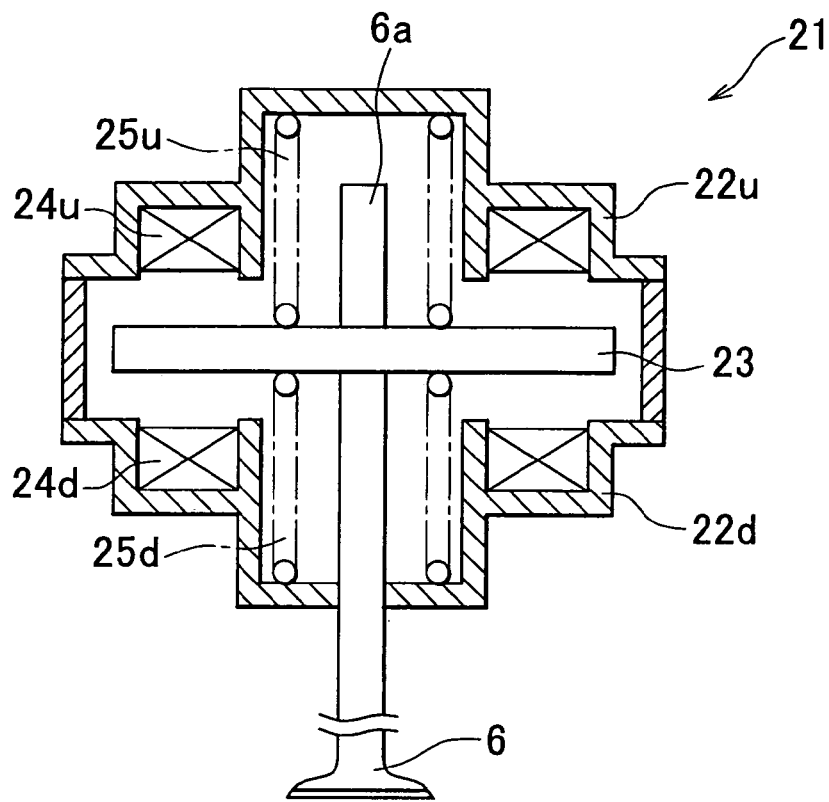
FIG. 4 is a sectional view showing an intake valve drive device according to the embodiment of the invention.

In the embodiment of the invention, each intake valve drive device 21 is constituted by an electromagnetic intake valve drive device, as shown in FIG. 4. The intake valve drive device 21 includes an upper fixed core 22u and a lower fixed core 22d, a disk 23, an upper solenoid coil 24u and a lower solenoid coil 24d, and compression springs 25u and 25d. The upper fixed core 22u and the lower fixed core 22d are made of magnetic material, and arranged apart from each other. The disk 23 is made of magnetic material, housed in a gap between the upper core 22u and the lower core 22d, and fixed to the stem 6a of the intake valve 6. The upper solenoid coil 24u and the lower solenoid coil 24d are fixed to the upper core 22u and the lower core 22d, respectively so as to face the disk 23. The compression spring 25u is inserted between the disk 23 and the upper core 22u. The compression spring 25d is inserted between the disk 23 and the lower core 22d. When the intake valve 6 is to be opened, the lower solenoid coil 24d is energized, and the upper solenoid coil 24u is de-energized. As a result, the disk 23 is attracted by magnetic attraction force generated by the lower solenoid coil 24d. Thus, the intake valve 6 is moved downward, and is opened. When the intake valve 6 is to be closed, the upper solenoid coil 24u is energized, and the lower solenoid coil 24d is de-energized. As a result, the disk 23 is attracted by magnetic attraction force generated by the upper solenoid coil 24u. Thus, the intake valve 6 is moved upward, and is closed.

Accordingly, by controlling the time point at which electric power is supplied to each of the upper and lower solenoid coils 24u and 24d, the opening/closing operation of the intake valve 6, for example, the retard amount RET of the intake valve 6 (FIG. 3) can be changed. Further, by controlling each intake valve drive device 21 independently, the opening/closing operation of the intake valve 6 of each cylinder can be controlled independently. For example, the retard amount RETi (i=1, 2, 3, 4) of the intake valve 6 of a cylinder No. "i" (i=1, 2, 3, 4) can be changed individually.

The amount of air charged in a cylinder is referred to as "charged air amount". By controlling each intake valve drive device 21 to control the opening/closing operation of the intake valve 6 of each cylinder, the charged air amount in each cylinder can be controlled. That is, by increasing the retard amount RETi (i=1, 2, 3, 4) of the intake valve 6 of the cylinder No. "i" (i=1, 2, 3, 4), the amount of burned gas flowing back from the combustion chamber 5 to the intake port 7 can be decreased during intake stroke, and therefore, the charged air amount in the cylinder No. "i" (i=1, 2, 3, 4) can be increased. By decreasing the retard amount RETi (i=1, 2, 3, 4) of the intake valve 6 of the cylinder No. "i"

(i=1, 2, 3, 4), the amount of burned gas flowing back to the intake port 7 can be increased, and therefore, the charged air amount in the cylinder No. "i" (i=1, 2, 3, 4) can be decreased.

Figure 5:
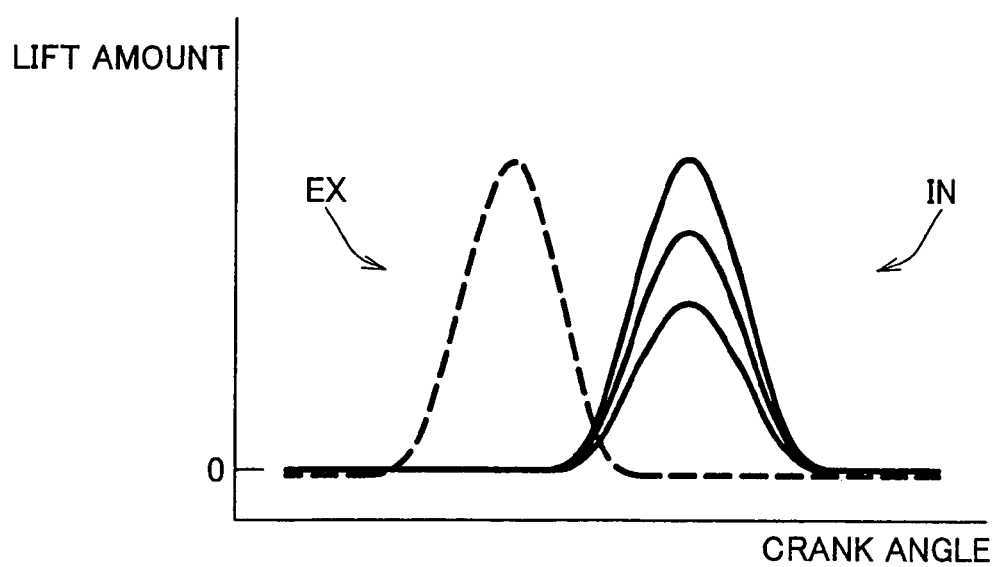
FIG. 5 is a diagram explaining the opening/closing operation of the intake valve according to another embodiment of the invention.

The charged air amount can be controlled also by continuously changing the maximum lift amount of the intake valve 6 while maintaining the opening timing and closing timing of the intake valve 6 at substantially constant values, as shown in FIG. 5. In FIG. 5, a dashed line indicates the lift amount of the exhaust valve 8.

The intake valve drive device 21 may be constituted by a cam fitted to a camshaft. In this case, by changing the rotational phase variation between a timing pulley connected to the crankshaft and the camshaft, the opening timing of the intake valve 6 can be changed. Alternatively, by changing the profile of the cam, the maximum lift amount or the duration of the intake valve 6 can be changed.

In the internal combustion engine shown in FIG. 1, fuel supply to the engine is temporarily stopped when the engine is decelerating. This will be briefly described with reference to FIG. 6.

Figure 6:
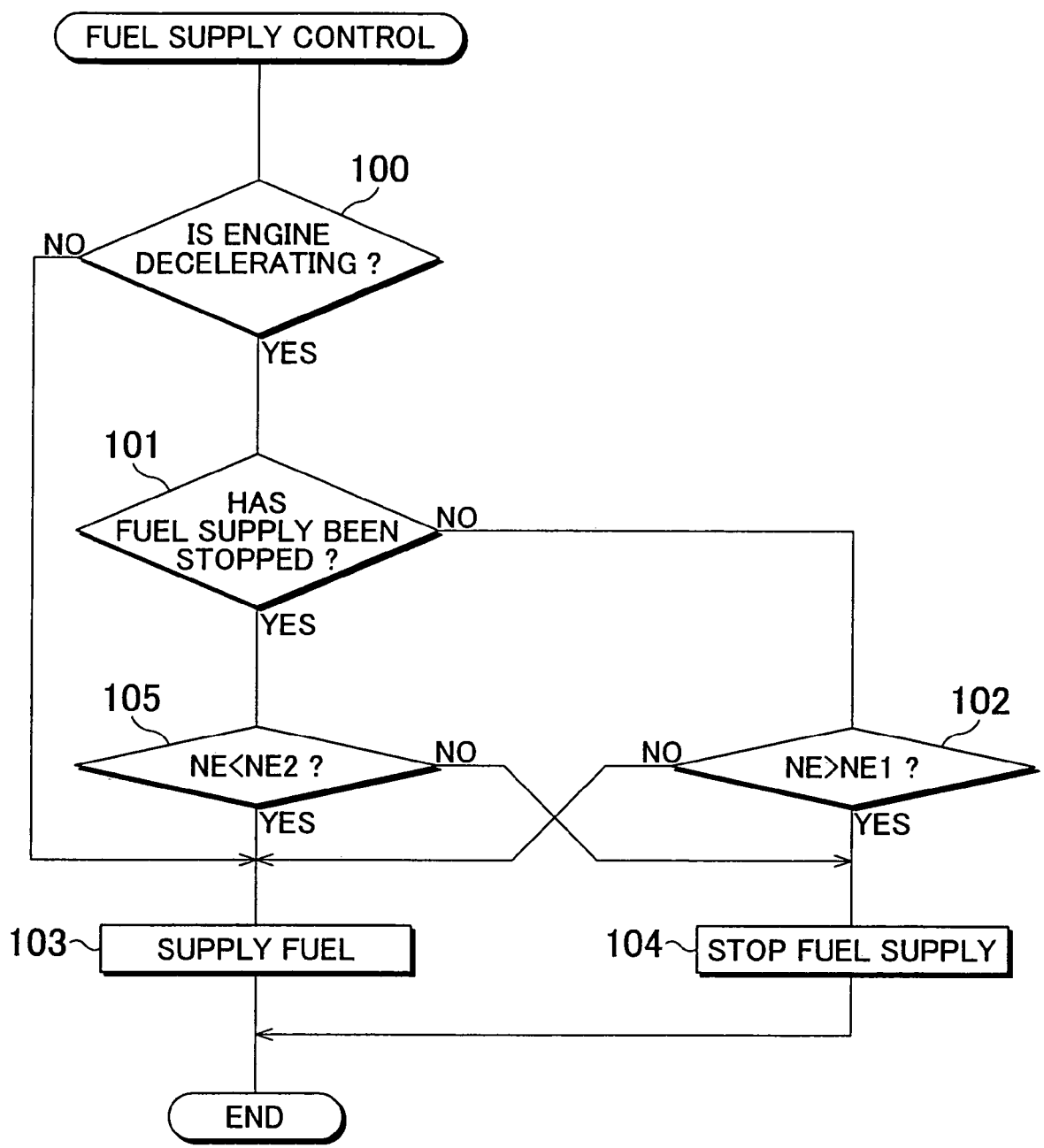
FIG. 6 is a flowchart showing a fuel supply control routine for the internal combustion engine shown in FIG. 1.

FIG. 6 shows a fuel supply control routine for the internal combustion engine shown in FIG. 1. This routine is executed by an interrupt at predetermined time intervals. As shown in FIG. 6, first, in step 100, it is determined whether the engine is decelerating. When it is determined that the engine is not decelerating in step 100, the routine is finished. When it is determined that the engine is decelerating in step 100, the routine proceeds to step 101. In step 101, it is determined whether fuel supply has been stopped. When it is determined that fuel is supplied in step 101, the routine proceeds to step 102. In step 102, it is determined whether the engine speed NE is higher than a first predetermined speed NE1. When it is determined that the engine speed NE is lower than or equal to the first predetermined speed NE1 (NE≦NE1) in step 102, the routine proceeds to step 103, and the fuel continues to be supplied. When it is determined that the engine speed NE is higher than the first predetermined speed NE1 (NE>NE1) in step 102, the routine proceeds to step 104, and the fuel supply is stopped. Then, the routine is finished. When it is determined that the fuel supply has been stopped in step 101, the routine proceeds to step 105. In step 105, it is determined whether the engine speed NE is lower than a second predetermined speed NE2. The second predetermined speed NE2 is lower than the first predetermined speed NE1 (NE2<NE1). When it is determined that the engine speed NE is higher than or equal to the second predetermined speed (NE≧NE2) in step 105, the routine proceeds to step 104, and the fuel supply continues to be stopped. When it is determined that the engine speed NE is lower than the second predetermined speed (NE<NE2) in step 105, the routine proceeds to step 103, and the fuel supply is restarted. Then, the routine is finished.

If deposit, which is mainly made of solid carbon, is formed on the inner wall surface of the intake port 7 or the intake valve 6, the area of an intake passage is smaller than a normal value. Therefore, the charged air amount may be smaller than a target amount or a normal amount. Also, in the case where the intake valve 6 is driven by the cam, if the gap between the cam and the intake valve 6 deviates from a normal value, the charged air amount may deviate from the target amount.

The cylinder pressure when the fuel supply is stopped (hereinafter, referred to as "fuel-stop cylinder pressure") varies depending on the charged air amount. That is, as the charged air amount is increased, for example, the peak value of the fuel-stop cylinder pressure, which is reached when the piston 4 is near the top dead center (TDC), is increased. As the charged air amount is decreased, the peak value of the fuel-stop cylinder pressure is decreased.

Accordingly, in the embodiment of the invention, the fuel-stop cylinder pressure, which is the cylinder pressure when the fuel supply is stopped, is detected. Then, it is determined whether the charged air amount is in a target amount range, based on the detected fuel-stop cylinder pressure.

Figure 7:
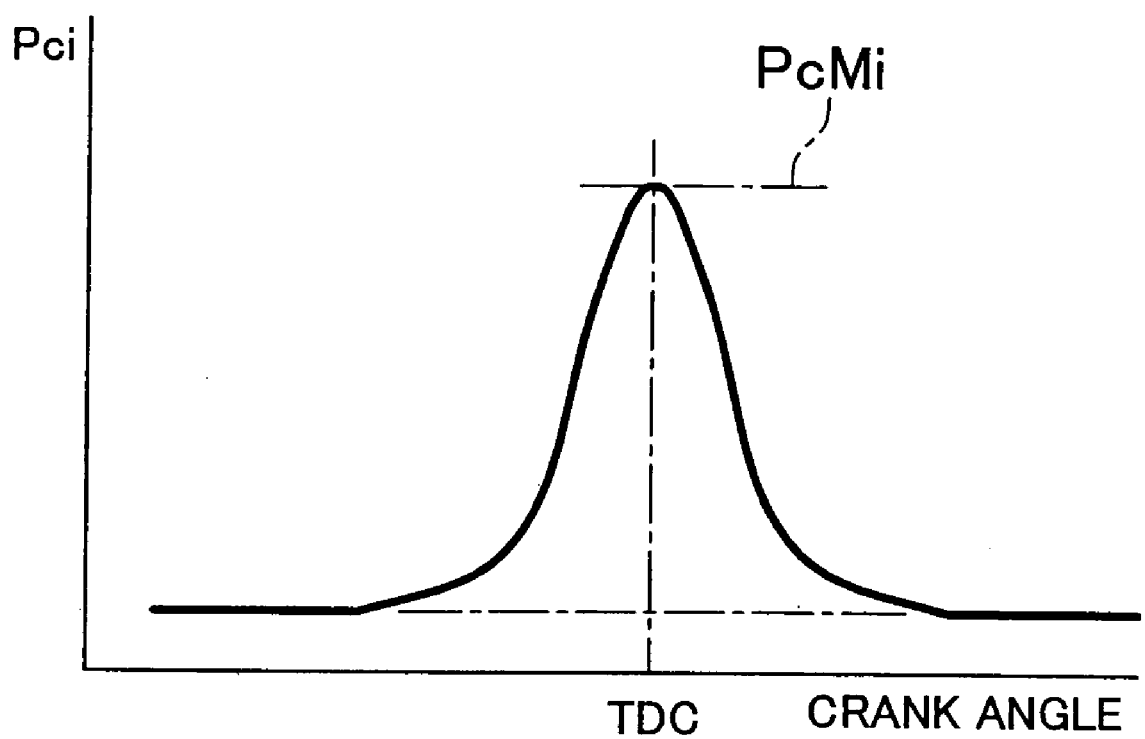
FIG. 7 is a graph showing cylinder pressure.

More specifically, first, a fuel-stop cylinder pressure Pci (i=1, 2, 3, 4) in the cylinder No. "i" (i=1, 2, 3, 4) is detected. FIG. 7 shows an example of the result of the detection. Next, for example, the peak value PcMi of the fuel-stop cylinder pressure Pci is determined. Instead of the peak value PcMi, the average value of the fuel-stop cylinder pressure Pci during one engine cycle, the area of a figure surrounded by a curve Pci indicating the fuel-stop cylinder pressure Pci, the length of the trajectory of the curve Pci, or the like may be used.

Next, the allowable range (described later) of the peak value PcMi, which corresponds to the target amount range of the charged air amount, is determined. Then, it is determined whether the peak value PcMi of the fuel-stop cylinder pressure Pci in the cylinder No. "i" is in the allowable range. When the peak value PcMi of the fuel-stop cylinder pressure Pci is in the allowable range, it is determined that the charged air amount in the cylinder No. "i" is in the target amount range. When the peak value PcMi of the fuel-stop cylinder pressure Pci is out of the allowable range, it is determined that the charged air amount in the cylinder No. "i" is out of the target amount range.

In addition, when it is determined that the charged air amount in at least one of the cylinders is out of the target amount range, it is determined that an abnormality has occurred in the vehicle, and the warning device 55 (FIG. 1) is operated.

Figure 8:
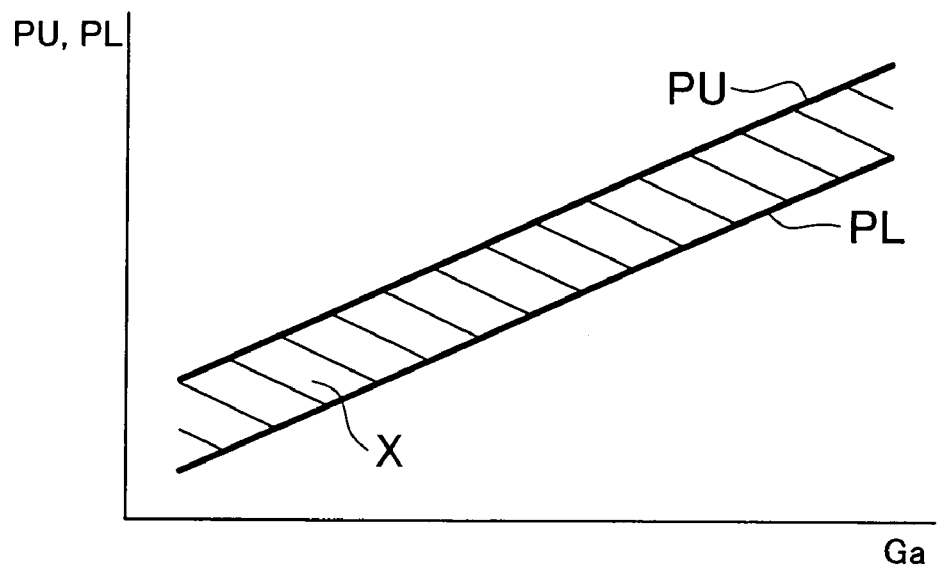
FIG. 8 is a map showing an allowable upper limit value PU and an allowable lower limit value PL.

The allowable range will be described. In the embodiment of the invention, the allowable range X is defined by an allowable upper limit value PU and an allowable lower limit value PL, as shown in FIG. 8. The allowable upper limit value PU and the allowable lower limit value PL are obtained in advance through experiment, as the functions of the intake air amount Ga when the fuel supply is stopped. The allowable upper limit value PU and the allowable lower limit value PL are stored in the ROM 42 in advance, in the form of a map shown in FIG. 8.

Figure 9:
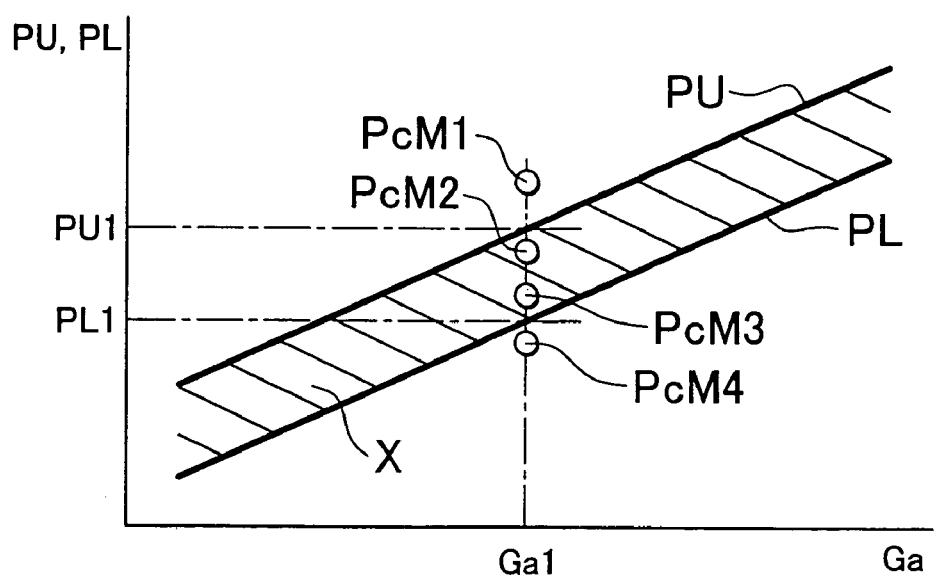
FIG. 9 is a diagram explaining the embodiment of the invention.

In an example shown in FIG. 9, in the case where the value of the intake air amount Ga when the fuel supply is stopped is Ga1, the allowable upper limit value PU is PU1 and the allowable lower limit value PL is PL1. In this case, the peak value PcM2 of the fuel-stop cylinder pressure Pc2 in the cylinder No. 2 and the peak value PcM3 of the fuel-stop cylinder pressure Pc3 in the cylinder No. 3 are in the allowable range X. Thus, the charged air amount in each of the cylinders No. 2 and No. 3 is in the target amount range. However, the peak value PcM1 of the fuel-stop cylinder pressure Pc1 in the cylinder No. 1 is larger than the allowable upper limit value PU1, and is out of the allowable range X. Thus, the charged air amount in the cylinder No. 1 is larger than the upper limit of the target amount range. The peak value PcM4 of the fuel-stop cylinder pressure Pc4 in the cylinder No. 4 is smaller than the allowable lower limit value PL1, and is out of the allowable range X. Thus, the charged air amount in the cylinder No. 4 is smaller than the lower limit of the target amount range. Accordingly, the warning device 55 is operated.

The fuel-stop cylinder pressure Pci is not influenced by combustion. That is, the fuel-stop cylinder pressure Pci is not influenced by the fuel injection amount, the fuel injection timing, or the ignition timing. Accordingly, the fuel-stop cylinder pressure Pci accurately corresponds to the charged air amount. Thus, it can be accurately determined whether the charged air amount is in the target amount range, based on the fuel-stop cylinder pressure Pci.

Figure 10:
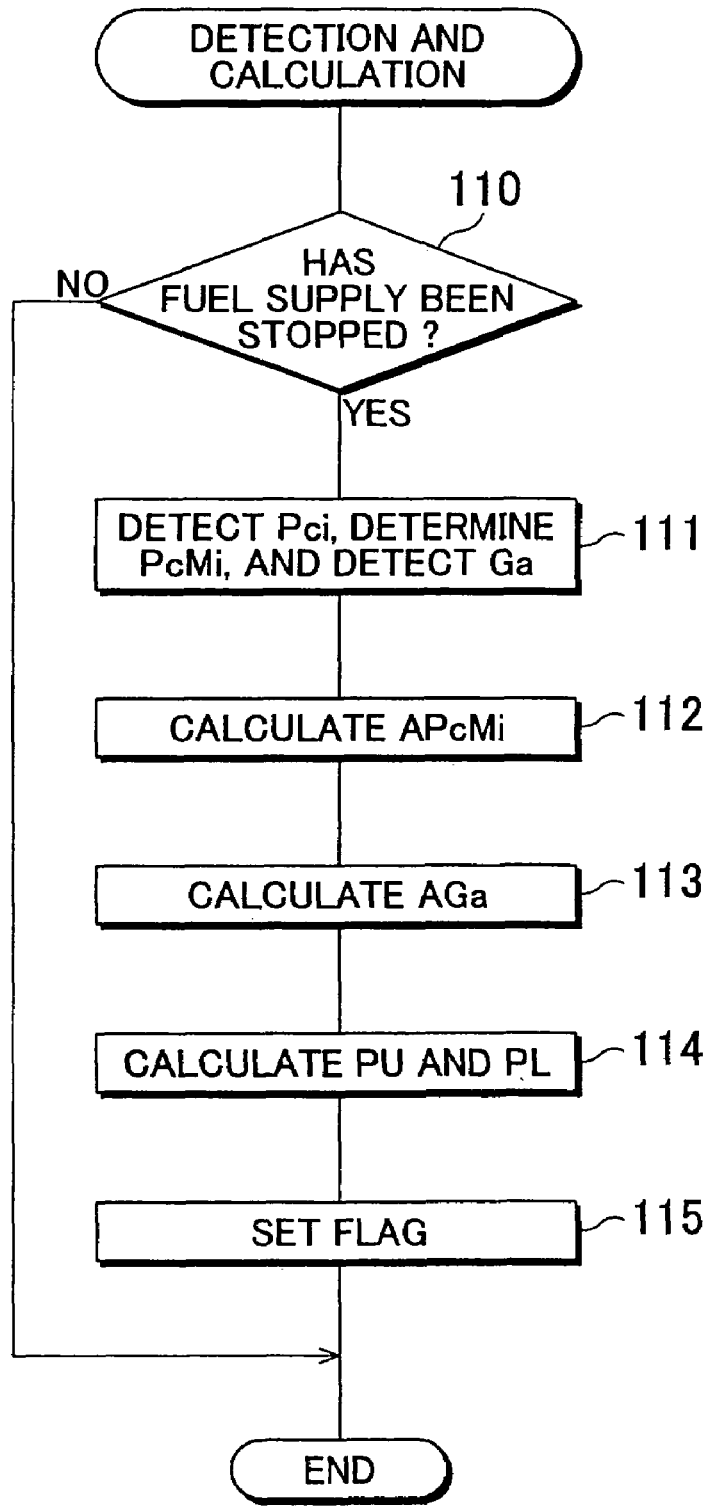
FIG. 10 is a flowchart showing a detection and calculation routine according to the embodiment of the invention.

FIG. 10 shows a detection and calculation routine according to the embodiment of the invention. This routine is executed by an interrupt at predetermined time intervals.

As shown in FIG. 10, first, in step 110, it is determined whether the fuel supply has been stopped. When it is determined that fuel is supplied in step 110, the routine is finished. When it is determined that the fuel supply has been stopped in step 110, the routine proceeds to step 111. In step 111, the fuel stop in-pressure Pci in the cylinder No. "i" is detected in a plurality of engine cycles, and the peak value PcMi of the fuel-stop cylinder pressure Pci in the cylinder No. "i" (i=1, 2, 3, 4) is determined. Also, the intake air amount Ga is detected when the fuel-stop cylinder pressure Pci is detected. In subsequent step 112, the average APcMi of the peak value PcMi of the fuel-stop cylinder pressure Pci in the cylinder No. "i" in the plurality of engine cycles is calculated. In subsequent step 113, the average AGa of the intake air amount Ga in the plurality of engine cycles is calculated. In subsequent step 114, the allowable upper limit value PU and the allowable lower limit value PL are calculated based on the map in FIG. 8. In subsequent step 115, a flag is set to indicate that the calculations of the average APcMi of the peak value PcMi, the allowable upper limit value PU, and the allowable lower limit value PL have been completed. Then, the routine is finished.

Figure 11:
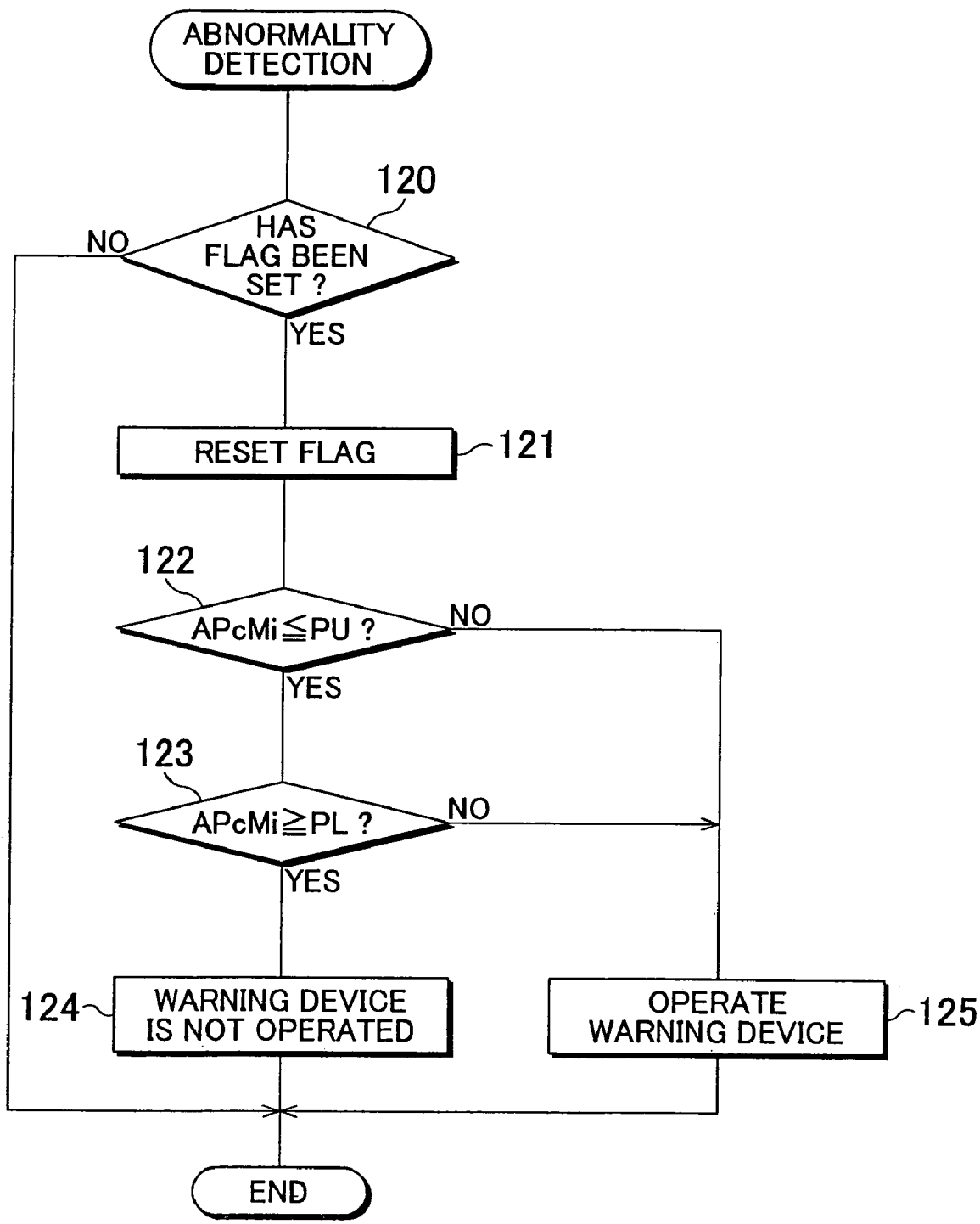
FIG. 11 is a flowchart showing an abnormality detection routine according to the embodiment of the invention.

FIG. 11 shows an abnormality detection routine according to the embodiment of the invention. This routine is executed by an interrupt at predetermined time intervals.

As shown in FIG. 11, first, it is determined whether the flag, which is set in the routine in FIG. 10, has been set. When the flag has not been set, the routine is finished. When the flag has been set, the routine proceeds to step 121, and the flag is reset. In subsequent step 122, it is determined whether the average APcMi (i=1, 2, 3, 4) of the peak value PcMi in the cylinder No. "i" is smaller than or equal to the upper limit value PU. When it is determined that the average APcMi is smaller than or equal to the upper limit value PU (APcMi≦PU) in step 122, the routine proceeds to step 123. In step 123, it is determined whether the average APcMi of the peak value PcMi in the cylinder No. "i" is larger than or equal to the allowable lower limit value PL. When it is determined that the average APcMi is larger than or equal to the allowable lower limit value PL (APcMi≧PL), that is, when it is determined that the average APcMi of the peak value PcMi in each of all the cylinders is in the allowable range X in step 123, the routine proceeds to step 124. In this case, the warning device 55 (FIG. 1) is not operated. That is, in this case, it is determined that the charged air amount in each of all the cylinders is in the target amount range.

When it is determined that the average APcMi is larger than the allowable upper limit value PU (APcMi>PU) in step 122, or when it is determined that the average APcMi is smaller than the allowable lower limit value PL (APcMi<PL) in step 123, the routine proceeds to step 125, and the warning device 55 is operated. That is, in this case, it is determined that the charged air amount in at least one of the cylinders is out of the target amount range.

Next, another embodiment of the invention will be described.

As described above, by controlling each of the intake valve drive devices 21 to control the opening/closing operation of the intake valve 6 of each cylinder, the charged air amount in each cylinder can be controlled.

Accordingly, in the other embodiment of the invention, when it is determined that the charged air amount in at least one of the cylinders is out of the target amount range, the charged air amount in the at least one of the cylinders is controlled so that the charged air amount in the at least one of the cylinders falls in the target amount range.

More specifically, when the peak value PcMi of the fuel-stop cylinder pressure Pci in the cylinder No. "i" is larger than the allowable upper limit value PU (FIG. 8), the charged air amount in the cylinder No. "i" is decreased by decreasing the retard amount RETi of the intake valve 6 of the cylinder No. "i" by a predetermined value "r". When the peak value PcMi of the fuel-stop cylinder pressure Pci in the cylinder No. "i" is smaller than the allowable lower limit value PL (FIG. 8), the charged air amount in the cylinder No. "i" is increased by increasing the retard amount RETi of the intake valve 6 of the cylinder No. "i" by the predetermined value "r". The charged air amount is corrected in this manner until the peak value PcMi of the fuel-stop cylinder pressure Pci in the cylinder No. "i" falls in the allowable range X. As a result, the charged air amount in the cylinder No. "i" falls in the target amount range.

In the example shown in FIG. 9, the charged air amount in the cylinder No. 1 is decreased until the peak value PcM1 of the fuel-stop cylinder pressure Pc1 in the cylinder No. 1 falls in the allowable range X. The charged air amount in the cylinder No. 4 is increased until the peak value PcM4 of the fuel-stop cylinder pressure Pc4 in the cylinder No. 4 falls in the allowable range X.

FIG. 12 shows a charged air amount correction routine in the other embodiment of the invention. This routine is executed by an interrupt at predetermined time intervals.

As shown in FIG. 12, first, in step 130, it is determined whether the flag, which is set in the routine in FIG. 10, has been set. When it is determined that the flag has not been set in step 130, the routine is finished. When it is determined that the flag has been set in step 130, the routine proceeds to step 131, and the flag is reset. In subsequent step 132, it is determined whether the average APcMi (i=1, 2, 3, 4) of the peak value PcMi in the cylinder No. "i" is smaller than or equal to the allowable upper limit value PU. When it is determined that the average APcMi is smaller than or equal to the allowable upper limit value PU (APcMi≦PU) in step 132, the routine proceeds to step 133. In step 133, it is determined whether the average APcMi (i=1, 2, 3, 4) of the peak value PcMi in the cylinder No. "i" is larger than or equal to the allowable lower limit value PL. When it is determined that the average APcMi is larger than or equal to the allowable lower limit value PU (APcMi≧PL), that is, when it is determined that the average APcMi of the peak value PcMi in each of all the cylinders is in the allowable range X in step 133, the routine is finished. That is, in this case, it is determined that the charged air amount in each of all the cylinders is in the target amount range. Thus, the charged air amount is not corrected in any of cylinders.

When it is determined that the average APcMi is larger than the allowable upper limit value PU (APcMi>PU) in step 132, the routine proceeds to step 134. In step 134, the retard amount RETi of the intake valve 6 of the cylinder No. "i" is decreased by the predetermined value "r". That is, in this case, it is determined that the charged air amount in the cylinder No. "i" is larger than the upper limit of the target amount range, and the charged air amount in the cylinder No. "i" is decreased. When it is determined that the average APcMi is smaller than the allowable lower limit value PL (APcMi<PL) in step 133, the routine proceeds to step 135. In step 135, the retard amount RETi of the intake valve 6 of the cylinder No. "i" is increased by the predetermined value "r". That is, in this case, it is determined that the charged air amount in the cylinder No. "i" is smaller than the lower limit of the target amount range, and the charged air amount in the cylinder No. "i" is increased.

When the peak value PcMi of the fuel-stop cylinder pressure Pci in at least one of the cylinders is out of the allowable range X, and the peak value PcMi of the fuel-stop cylinder pressure Pci in each of the other cylinders is in the allowable range X, it is determined that the variation between the largest charged air amount and the smallest charged air amount among the charged air amounts in the cylinders is large. When the peak value PcMi of the fuel-stop cylinder pressure Pci in each of all the cylinders is in the allowable range X, it is determined that the variation between the largest charged air amount and the smallest charged air amount is small. Thus, by determining whether the peak value PcMi of the fuel-stop cylinder pressure Pci in each cylinder is in the allowable range X as described above, the variation between the largest charged air amount and the smallest charged air amount can be detected. Also, when the peak value PcMi of the fuel-stop cylinder pressure Pci in at least one of the cylinders is out of the allowable range X, and the peak value PcMi of the fuel-stop cylinder pressure Pci in each of the other cylinders is in the allowable range X, by executing control so that the peak value PcMi of the fuel-stop cylinder pressure Pci in each of all the cylinders falls in the allowable range X, the charged air amount in each cylinder can be controlled so as to decrease the variation between the largest charged air amount and the smallest charged air amount.

The charged air amount may be controlled by changing the maximum lift amount of the intake valve 6 while maintaining the opening timing and the closing timing of the intake valve 6 at substantially constant values, instead of changing the retard amount RETi of the intake valve 6. More specifically, when the peak value PcMi of the fuel-stop cylinder pressure Pci in the cylinder No. "i" is larger than the allowable upper limit value PU, the charged air amount in the cylinder No. "i" is decreased by decreasing the maximum lift amount of the intake valve 6 of the cylinder No. "i". When the peak value PcMi of the fuel-stop cylinder pressure Pci in the cylinder No. "i" is smaller than the allowable lower limit value PL, the charged air amount in the cylinder No. "i" is increased by increasing the maximum lift amount of the intake valve 6 of the cylinder No. "i". The charged air amount is corrected in this manner until the peak value PcMi of the fuel-stop cylinder pressure Pci in the cylinder No. "i" falls in the allowable range X. As a result, the charged air amount in the cylinder No. "i" falls in the target amount range.

For example, when the temperature in the cylinder is abnormally increased, or when combustion is not performed after ignition is performed, the fuel supply to the engine may be temporarily stopped. When the fuel supply is stopped for these reasons, the pressure in each cylinder may be detected.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An internal combustion engine comprising:
   stop means for temporarily stopping fuel supply to the internal combustion engine when the internal combustion engine is operating;
   pressure detection means for detecting pressure in each of cylinders when the fuel supply is stopped; and
   variation detection means for detecting a variation between a largest charged air amount and a smallest charged air amount among charged air amounts in the cylinders, which are amounts of air charged in the cylinders, based on the pressure in each of the cylinders, which is detected by the pressure detection means.

2. The internal combustion engine according to claim 1, further comprising:
   control means for controlling the charged air amount in each of the cylinders so as to decrease the variation, which is detected by the variation detection means.

3. An internal combustion engine comprising:
   stop means for temporarily stopping fuel supply to the internal combustion engine when the internal combustion engine is operating;
   pressure detection means for detecting pressure in each of cylinders when the fuel supply is stopped; and
   determination means for determining whether a charged air amount in each of the cylinders, which is an amount of air charged in each of the cylinders, is in a target amount range, based on the pressure in each of the cylinders, which is detected by the pressure detection means.

4. The internal combustion engine according to claim 3, further comprising:
   control means, wherein when the determination means determines that the charged air amount in at least one of the cylinders is out of the target amount range, the control means controls the charged air amount in the at least one of the cylinders so that the charged air amount in the at least one of the cylinders falls in the target amount range.

5. An internal combustion engine comprising:
   a stop device that temporarily stops fuel supply to the internal combustion engine when the internal combustion engine is operating;
   a pressure detection device that detects pressure in each of cylinders when the fuel supply is stopped; and
   a variation detection device that detects a variation between a largest charged air amount and a smallest charged air amount among charged air amounts in the cylinders, which are amounts of air charged in the cylinders, based on the pressure in each of the cylinders, which is detected by the pressure detection device.

6. The internal combustion engine according to claim 5, further comprising:
   a control device that controls the charged air amount in each of the cylinders so as to decrease the variation between the largest charged air amount and the smallest charged air amount, which is detected by the variation detection device.

7. The internal combustion engine according to claim 6, wherein
   the control device decreases a retard amount of an intake valve of each of the cylinders in a case where a maximum value of the pressure in each of the cylinders when the fuel supply is stopped is larger than an allowable upper limit value;

the control device increases the retard amount of the intake valve of each of the cylinders in a case where the maximum value of the pressure in each of the cylinders when the fuel supply is stopped is smaller than an allowable lower limit value; and the retard amount of the intake valve is an amount by which an opening period of the intake valve is retarded with respected to a most advanced opening period of the intake valve.

8. The internal combustion engine according to claim 6, wherein the control device decreases a maximum lift amount of an intake valve of each of the cylinders in a case where a maximum value of the pressure in each of the cylinders when the fuel supply is stopped is larger than an allowable upper limit value; and the control device increases the maximum lift amount of the intake valve of each of the cylinders in a case where the maximum value of the pressure in each of the cylinders when the fuel supply is stopped is smaller than an allowable lower limit value.

9. The internal combustion engine according to claim 5, further comprising:

an output device that performs an output operation based on the variation between the largest charged air amount and the smallest charged air amount, which is detected by the variation detection device.

10. The internal combustion engine according to claim 9, wherein the output device is a warning device that outputs a warning when the variation between the largest charged air amount and the smallest charged air amount is larger than a predetermined value.

11. An internal combustion engine comprising:

a stop device that temporarily stops fuel supply to the internal combustion engine when the internal combustion engine is operating;

a pressure detection device that detects pressure in each of cylinders when the fuel supply is stopped; and a determination device that determines whether a charged air amount in each of the cylinders, which is an amount of air charged in each of the cylinders, is in a target amount range, based on the pressure in each of the cylinders, which is detected by the pressure detection device.

12. The internal combustion engine according to claim 11, further comprising:

a control device, wherein when the determination device determines that the charged air amount in at least one of the cylinders is out of the target amount range, the control device controls the charged air amount in the at least one of the cylinders so that the charged air amount in the at least one of the cylinders falls in the target amount range.

13. The internal combustion engine according to claim 12, wherein the control device decreases a retard amount of an intake valve of each of the cylinders in a case where a maximum value of the pressure in each of the cylinders when the fuel supply is stopped is larger than an allowable upper limit value;

the control device increases the retard amount of the intake valve of each of the cylinders in a case where the maximum value of the pressure in each of the cylinders when the fuel supply is stopped is smaller than an allowable lower limit value; and the retard amount of the intake valve is an amount by which an opening period of the intake valve is retarded with respected to a most advanced opening period of the intake valve.

14. The internal combustion engine according to claim 12, wherein the control device decreases a maximum lift amount of an intake valve of each of the cylinders in a case where a maximum value of the pressure in each of the cylinders when the fuel supply is stopped is larger than an allowable upper limit value; and the control device increases the maximum lift amount of the intake valve of each of the cylinders in a case where the maximum value of the pressure in each of the cylinders when the fuel supply is stopped is smaller than an allowable lower limit value.

15. The internal combustion engine according to claim 11, further comprising an output device that performs an output operation based on a result of a determination made by the determination device.

16. The internal combustion engine according to claim 15, wherein the output device is a warning device that outputs a warning when the variation between the largest charged air amount and the smallest charged air amount is larger than a predetermined value.

17. A method of detecting an abnormality in an internal combustion engine, comprising:

temporarily stopping fuel supply to the internal combustion engine when the internal combustion engine is operating;

detecting pressure in each of cylinders when the fuel supply is stopped; and detecting a variation between a largest charged air amount and a smallest charged air amount among charged air amounts in the cylinders, which are amounts of air charged in the cylinders, based on the detected pressure in each of the cylinders.

18. A method of detecting an abnormality in an internal combustion engine, comprising:

temporarily stopping fuel supply to the internal combustion engine when the internal combustion engine is operating;

detecting pressure in each of cylinders when the fuel supply is stopped; and determining whether a charged air amount in each of the cylinders, which is an amount of air charged in each of the cylinders, is in a target amount range, based on the detected pressure in each of the cylinders.

* * * * *